United States Patent
Arakawa et al.

(10) Patent No.: US 6,779,081 B2
(45) Date of Patent: Aug. 17, 2004

(54) APPARATUS AND METHOD FOR DEFRAGMENTATION IN DISK STORAGE SYSTEM

(75) Inventors: Yutaka Arakawa, Ome (JP); Seiji Mizukoshi, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 205 days.

(21) Appl. No.: 10/091,566

(22) Filed: Mar. 7, 2002

(65) Prior Publication Data

US 2002/0129200 A1 Sep. 12, 2002

(30) Foreign Application Priority Data

Mar. 8, 2001 (JP) ......................................... 2001-065248

(51) Int. Cl.$^7$ ............................................. G06F 12/00
(52) U.S. Cl. ........................ 711/112; 711/111; 711/165; 711/171; 711/172; 707/205; 707/206
(58) Field of Search .......................... 711/111, 112, 165, 711/171, 172; 707/205, 206

(56) References Cited

U.S. PATENT DOCUMENTS 6,253,300 B1 * 6/2001 Lawrence et al. .......... 711/173
6,446,237 B1 * 9/2002 Menon ........................ 714/800

FOREIGN PATENT DOCUMENTS

JP 10-11337 1/1998
WO WO 97/37297 10/1997

* cited by examiner

*Primary Examiner*—Donald Sparks
*Assistant Examiner*—Bao Q. Truong
(74) *Attorney, Agent, or Firm*—Pillsbury Winthrop LLP

(57) ABSTRACT

When a host system has requested the reading of sequential data, a CPU incorporated in an HDD determines whether the data is fragmented into a plurality of data blocks on a disk. If the sequential data is fragmented, the CPU executes the control of reading the data from the disk and transferring it to the host system. In parallel with this control, the CPU also executes the control of writing the data read from the disk, to a contiguous area on the disk.

17 Claims, 8 Drawing Sheets

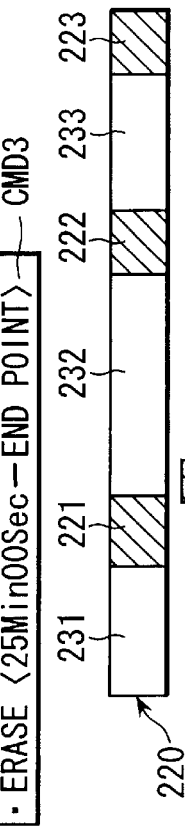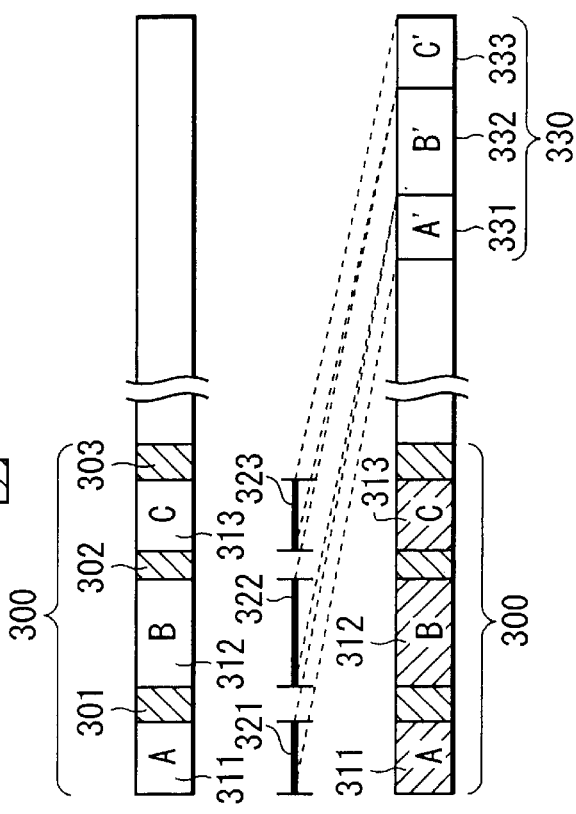

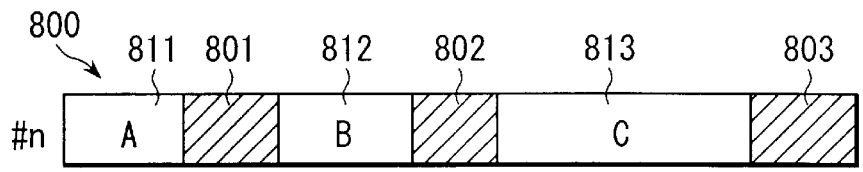
FIG. 8A
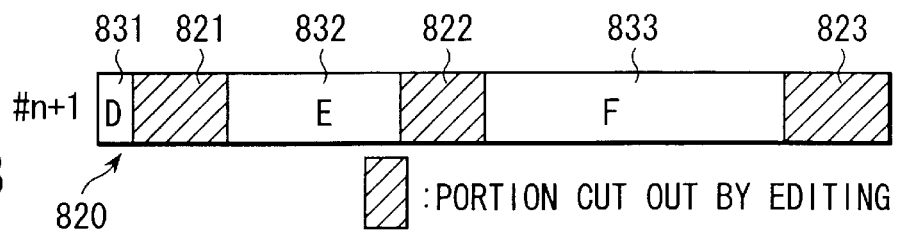
FIG. 8B
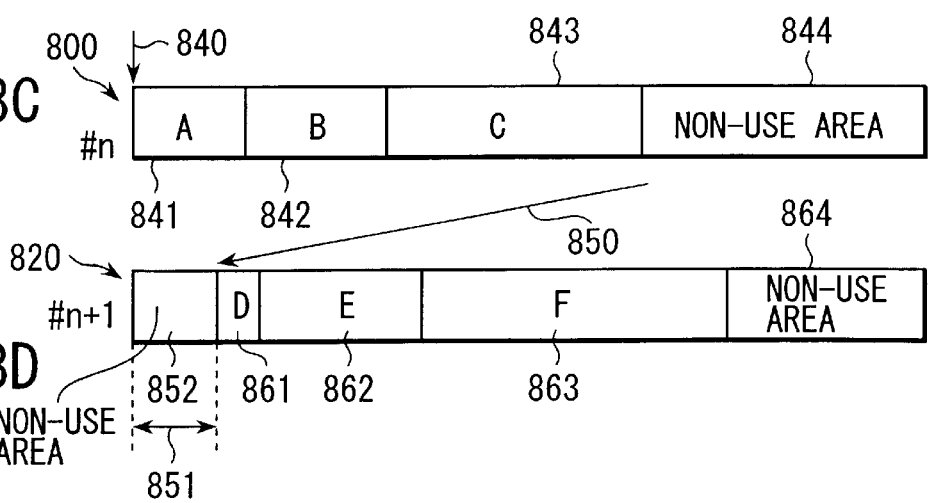
FIG. 8C
FIG. 8D
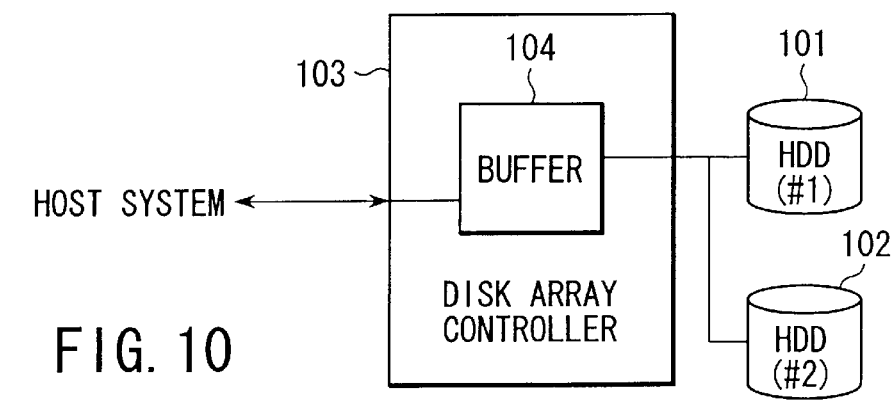
FIG. 10

APPARATUS AND METHOD FOR DEFRAGMENTATION IN DISK STORAGE SYSTEM

CROSS-REFERENCE TO RELATED APPLICATIONS

This application is based upon and claims the benefit of priority from the prior Japanese Patent Application No. 2001-065248, filed Mar. 8, 2001, the entire contents of which are incorporated herein by reference.

BACKGROUND OF THE INVENTION

1. Field of the Invention

The present invention relates to a disk storage system suitable for automatic defragmentation of fragmented sequential data on a disk medium by, for example, editing.

2. Description of the Related Art

The storage capacity of a disk storage system, for example, a hard disk drive (hereinafter referred to as an "HDD") is now showing a tendency to increase. In accordance with this, HDDs have come to be used as AV-HDDs for recording so-called AV (Audio Visual) data such as digital music data and digital video data, etc. Since AV data is temporally-sequenced data, it is also called an AV stream (data stream).

A user can edit AV data recorded in an HDD, using a host system. When an unnecessary section of AV data has been cut by editing, fragmentation of data always occurs, which degrades the performance of the AV-HDD. To suppress the fragmentation of data, it is necessary to rearrange data, i.e., to execute defragmentation, at an appropriate point in time.

In the prior art, to execute defragmentation, it is necessary for the user to operate, at a certain point in time, a utility program for the defragmentation. The utility program operates in the host system. As a result of the execution of this program, fragmented data in the HDD is once transferred to a memory in the host system. The fragmented data items transferred to the memory are rearranged so that they can be stored in correct order in the HDD. Then, they are written to the HDD. At this time, the fragmentation state of AV data in the HDD is eliminated, whereby the degradation of the performance of the HDD is avoided.

Jpn. Pat. Appln. KOKAI Publication No. 10-11337 describes a technique for shifting frequent-use data to an area in which such a fragmentation state has not yet developed. In this technique, the performance of data reading is enhanced by shifting frequent-use fragmented data to a contiguous area. Further, since the number of areas in which fragmented data items are stored is reduced, the amount of data to be processed by a garbage collection process is reduced.

As described above, in the prior art, to improve the fragmentation state of AV data stored in an HDD, it is necessary to execute defragmentation of AV data by activating a utility program in a host system. This technique, however, inevitably involves a degradation of the performance of the host system, although it can prevent a degradation of the performance of the HDD. Moreover, in this technique, during the time defragmentation is executed, input/output of data for, for example, reproduction of an AV stream cannot be executed between the host system and the HDD.

To prevent a degradation of the performance of the host system, a method could be devised where a function for executing defragmentation independently of the host system is imparted to the AV-HDD. In this case, however, data still cannot be input/output between the host system and the HDD during the time defragmentation is executed.

In addition, a method could be devised where a technique disclosed in the aforementioned publication No. 10-11337 is applied to a defragmentation process in the HDD, thereby executing defragmentation only on frequent-use AV data. In this case, the load applied on the HDD when executing defragmentation can be minimized, and the reading performance of frequent-use AV data can be enhanced. However, during the time defragmentation is executed, input/output of data for, for example, reproduction of an AV stream cannot be executed between the host system and the HDD as in the prior art. Furthermore, the reading performance of occasional-use AV data is as low as in the prior art.

BRIEF SUMMARY OF THE INVENTION

The present invention has been developed in light of the above, and aims to enable automatic defragmentation by reproducing temporally-sequenced data in response to a request from a host system to a disk storage system, and simultaneously writing the reproduced data to a contiguous area.

According to an aspect of the invention, there is provided a disk storage system for writing data to a disk medium and reading data from the disk medium. This system comprises fragmentation determining means and controlling means. The fragmentation determining means determines, when a host system has requested the disk storage system to read temporally-sequenced data, whether the temporally-sequenced data is fragmented into a plurality of data blocks on the disk medium. The controlling means executes the control of writing the temporally-sequenced data read from the disk medium to a contiguous area on the disk medium, in parallel with the execution of the control of reading the temporally-sequenced data from the disk medium and transferring the read temporally-sequenced data to the host system, if the fragmentation determining means determines that the temporally-sequenced data is fragmented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 2A to 2C are views illustrating an example of edited, fragmented AV data;

FIGS. 3A to 3C are views useful in explaining, in outline, a defragmentation process executed in the first embodiment for reproducing an AV stream from a fragmented AV track;

FIGS. 8A to 8D are views useful in explaining, in outline, a defragmentation process executed in a third embodiment for reproducing an AV stream from a fragmented AV track;

FIG. 10 is a block diagram illustrating a disk array apparatus according to a fourth embodiment of the invention.

DETAILED DESCRIPTION OF THE INVENTION

Figure 1:
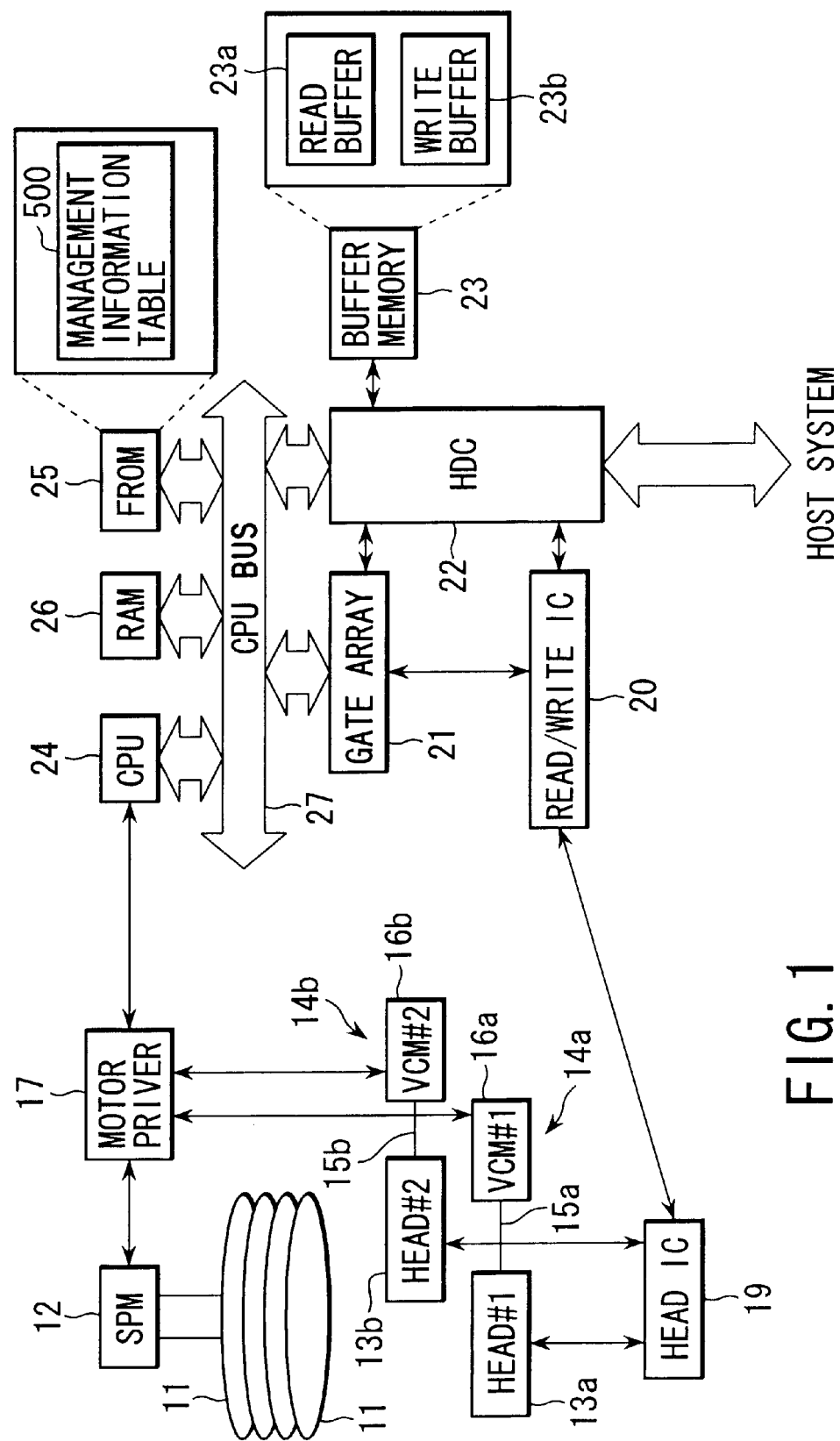
FIG. 1 is a block diagram illustrating a hard disk drive according to a first embodiment of the invention.

Embodiments of the present invention will now be described with reference to the accompanying drawings.
First Embodiment FIG. 1 is a block diagram illustrating the configuration of a hard disk drive according to a first embodiment of the invention. The hard disk drive (HDD) shown in FIG. 1 comprises a plurality of magnetic disks (magnetic disk medium) 11. Each disk 11 is supported by a spindle motor (SPM) 12 and rotated by it at high speed. Each disk 11 has two disk surfaces—upper and lower surfaces. At least one surface of each disk 11 (in this embodiment, both the disk surfaces) serves as a recording surface for recording data. Two heads, 13a (HEAD#1) and 13b (HEAD#2), are provided for each recording surface of each disk 11. To aid clarity, FIG. 1 only shows that the heads 13a and 13b are provided for one recording surface of one disk 11. The heads 13a and 13b are used to write and read data to and from each disk 11. Although in the case of FIG. 1, an HDD with a plurality of stacked disks 11 is assumed to be employed, an HDD with a single disk 11 may be employed.

Each recording surface of each disk 11 includes a number of concentric data tracks (physical tracks). Each recording surface of each disk 11 also includes servo areas that record servo data used to position each head 13a or 13b at a target position on a target track. The servo areas are provided circumferentially at regular intervals between the inner periphery and outer periphery of each disk 11. The servo data includes a track code (cylinder number) and servo burst data. The track code is a track address for recognizing a data track. The servo burst data is position error data used for a track following operation executed to position each head at a target position on a target data track. A plurality of sectors (data sectors) are provided between the servo areas.

The heads 13a and 13b are attached to the tips of arms 15a and 15b incorporated in rotary actuators 14a and 14b, respectively. The actuators 14a and 14b can be driven independently. The actuators 14a and 14b include voice coil motors 16a (VCM#1) and 16b (VCM#2) for independently driving the arms 15a and 15b in a radial direction, respectively. The spindle motor 12 is powered by a driving current supplied from a motor driver 17. The actuators 14a and 14b are powered by respective driving currents independently supplied from the motor driver 17.

The heads 13a and 13b are connected to a head IC 19. The head IC 19 includes a read amplifier for amplifying a read signal read by the head 13a or 13b, and a write amplifier for converting write data into a write current. The head IC 19 is connected to a read/write IC 20. The read/write IC 20 executes various types of signal processes, such as an A/D (analog/digital) conversion process on a read signal, a coding process on write data, and a decoding process on read data, etc. The read/write IC 20 provides a pulsing function for pulsing a read signal into pulsed read data, and a function for extracting servo burst data from servo data in response to a timing signal (a burst timing signal) output from a gate array 21. The extracted servo burst data is supplied to a CPU 24, where it is used for track following control executed to position the head 13a or 13b at a target position on a target track.

The gate array 21 has a function for generating various types of timing signals that includes the burst timing signal, from a read pulse output from the read/write IC 20, and a function for extracting a track code from servo data. The track code is supplied to the CPU 24, where it is used for seek control executed to move the head 13a or 13b to a target track.

A disk controller (HDC) 22 is connected to a host system that uses the HDD. The host system is a digital device such as a personal computer. The disk controller 22 receives a command (a write command and a read command, etc.) transferred from the host system, and provides an interface control function for controlling data transfer between the disk controller 22 itself and the host system. The disk controller 22 also provides a disk control function for controlling data transfer between each disk 11 and the disk controller 22 itself via the read/write IC 20 and the head IC 19, and a buffer control function for controlling a buffer memory 23.

The buffer memory 23 includes a read buffer 23a for temporarily storing data (read data) read from each disk 11 and to be transferred to the host system, and a write buffer (write cash) 23b for temporarily storing data (write data) transferred from the host system and to be written to each disk 11. The buffer memory 23 is, for example, a RAM (Random Access Memory).

The CPU 24 is a main controller which controls the entire HDD in accordance with a control program stored in, for example, a FROM (Flash Read Only Memory) 25 as a rewritable nonvolatile memory. The control program includes a control routine for independently operating the heads 13a and 13b. In the control routine, while one of the heads is reading and reproducing AV data requested by the host system, as a temporally-sequenced AV stream, the other head writes the read data to a contiguous area of each disk 11. The FROM 25 stores a management information table 500 described later.

The CPU 24 is connected to the FROM 25 and a RAM 26. The RAM 26 provides, for example, a word area for the CPU 24. The gate array 21, disk controller 22, CPU 24, FROM 25 and RAM 26 are connected to each other by a CPU bus 27.

The operation of the configuration of FIG. 1 will be described. This embodiment is characterized in that when fragmented AV data is being reproduced from one of the disks 11 of the HDD shown in FIG. 1, a defragmentation process is simultaneously executed to assemble the fragmented AV data items in a contiguous area on the disk 11. The fragmented AV data items refer to temporally-sequenced AV data that are not arranged spatially continuously on the disk 11. The HDD shown in FIG. 1 is used as an AV-HDD for directly inputting and outputting an AV data stream, and is configured to manage a file system as described below.

When a user would like to edit AV data recorded in the HDD, they operate the host system to issue an edit command to the HDD. If the edit command is an ERASE command to erase data at a designated position, fragmentation of data inevitably occurs after editing. FIGS. 2A–2C show an example of editing AV data. In the description below, to discriminate AV data input to and output from the HDD, from AV data (contents) recorded in the HDD (disk 11), the former will be referred to as an "AV stream", and the latter as an "AV track". The AV track is generally recorded on a plurality of physical tracks. However, an AV track that is recorded on one physical track can exist. Further, a plurality of AV tracks are generally recorded in the HDD.

FIGS. 2A and 2B show the execution of an edit (erasure) process on an AV track 210, using edit (erase) commands CMD1, CMD2 and CMD3 for designating the erasure of data. Further, FIG. 2C illustrates an AV track 220 obtained after editing, in which data blocks 221, 222 and 223 are cut out by the edit process using the commands CMD1, CMD2 and CMD3. As a result of this, spaces are left, leaving data blocks 231, 232 and 233 in the AV track 220 fragmented.

Referring then to FIGS. 3A–3C, a defragmentation process executed to reproduce an AV stream from a fragmented AV track will be described roughly. FIG. 3A shows a pre-defragmented AV track 300. The AV track 300 corresponds to the edited AV track 220 of FIG. 2C. In the AV track 300, data blocks 301–303 are cut out as a result of the edit process, and the remaining data is fragmented into data blocks 311(A), 312(B) and 313(C).

In the embodiment, when reproducing an AV stream from the AV track 300 in response to a request from the host system, the AV track 300 is subjected to defragmentation. To this end, one of the heads 13a (HEAD#1) and 13b (HEAD#2) is used to reproduce the AV stream, and the other head is used to write the read or reproduced data to a contiguous area in the HDD (disk 11). In this case, the HEAD#1 (head 13a) is used for reproduction (reading), and the HEAD#2 (head 13b) is used for writing.

The reading of the AV track 300 by the HEAD#1 is executed for a time period required for the HEAD#1 to pass through sections 321, 322 and 323 on the disk 11, in which the fragmented data blocks 311(A), 312(B) and 313(C) are recorded. As a result, the data blocks 311(A), 312(B) and 313(C) are continuously read and reproduced as an AV stream.

The data blocks 311(A), 312(B) and 313(C) read by the HEAD#1 are written by the HEAD#2 as data blocks 331 (A'), 332(B') and 333(C') to a contiguous area in the HDD (disk 11), which is different from an area that store the AV track 300, as is shown in FIG. 3C. Thus, in the example shown in FIGS. 3A–3C, the operation of writing data blocks forming an AV stream to the contiguous area in the HDD, which differs from the area storing the AV track 300, is executed in parallel with the reproduction of the AV stream from the AV track 300. As a result, an AV track 330, in which the data blocks 331(A'), 332(B') and 333(C') corresponding to the data blocks 311(A), 312(B) and 313(C) that form a to-be-reproduced AV stream are arranged spatially continuously, is recorded in an area different from the area of the AV track 300.

Figure 4:
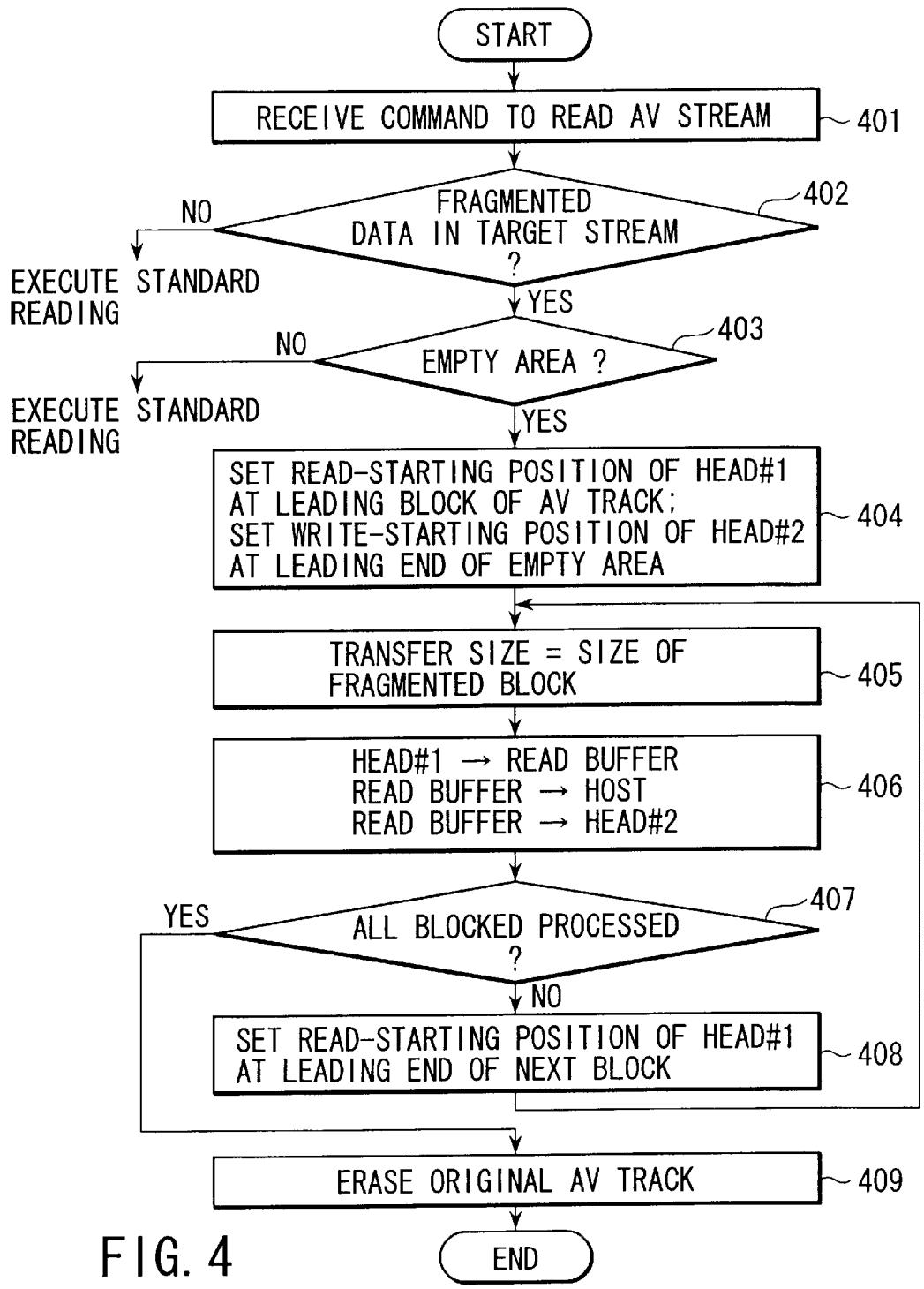
FIG. 4 is a flowchart useful in explaining a procedure for the defragmentation process employed in the first embodiment.

Referring now to the flowchart of FIG. 4, a detailed procedure for a defragmentation process executed by the CPU 24 will be described. Suppose that the CPU 24 has received, via the disk controller 22, a command to read (reproduce) an AV stream, issued from the host system (step 401). Upon receiving the read command from the host system, the CPU 24 determines whether or not the AV stream (target stream) requested by the read command contains fragmented data (step 402). This determination is realized by referring to the management information table 500 (see FIG. 5) as described later. If the target stream contains no fragmented data, the CPU 24 determines that the defragmentation process is not necessary. In this case, the CPU 24 reads the AV track designated by the read command, thereby executing standard read control for reproducing an AV stream.

On the other hand, if the target stream contains fragmented data, the CPU 24 determines whether or not the HDD (disk 11) has a contiguous empty area large enough to write the target stream (step 403). If such an empty area, i.e. a contiguous empty area large enough to store the whole target stream, does not exist, the CPU 24 determines that the defragmentation process cannot be executed. Also in this case, the CPU 24 reads the designated AV track and executes standard read control for reproducing an AV stream from the AV track.

If, on the other hand, such an empty area exists, the CPU 24 determines that the defragmentation process is possible. In this case, the CPU 24 executes a step 404. In this step, the CPU 24 sets the read-starting position of the HEAD#1 (head 13a) at the leading end of a leading block that is included in the fragmented data blocks of the designated AV track stored in the disk 11. Further, the CPU 24 sets the write-starting position of the HEAD#2 (head 13b) at the leading end of the above-mentioned empty area of the disk 11. After that, the CPU 24 individually moves the HEAD#1 and HEAD#2 to the respective set positions. As a result, if the read command from the host system designates the AV track 300 shown in FIG. 3A, the read-starting position of the HEAD#1 is set at the leading end of the data block 311.

After executing the step 404, the CPU 24 sets, as a transfer size, the size of the block in which the read-starting position is set (step 405). Subsequently, the CPU 24 executes a step 406. In this step, the CPU 24 causes the HEAD#1 to read, from the read-starting position set at the step 404, a data block of a transfer size set at the step 405. Thereafter, the CPU 24 causes the disk controller 22 to temporarily store the data, read by the HEAD#1, in the read buffer 23a of the buffer memory 23. At the step 406, the disk controller 22 transfers, to the host system, the data block stored in the read buffer 23a. At the step 406, the disk controller 22 also transfers the data block stored in the read buffer 23a, to the HEAD#2 via the read/write IC 20 and the head IC 19, whereby the HEAD#2 simultaneously writes the data block to the empty area of the disk 11, the write-starting position of which is set at the step 404. During the write operation of the data block, the write-starting position is automatically updated each time data of a predetermined size, for example, data of one sector, has been written.

Accordingly, in the case of FIGS. 3A–3C, the following read/write operation is executed. First, a usual read operation is executed, in which the leading data block 311(A) of the AV track 300 is read by the HEAD#1, then temporarily stored in the read buffer 23a, and transferred therefrom to the host system. In parallel with the read operation, a write operation is executed, in which the data block 311(A) stored in the read buffer 23a is written as the data block 331(A') by the HEAD#2 to the contiguous area of the disk 11, which differs from the area of the AV track 300. Thus, in the embodiment, the independently operable HEAD#1 and HEAD#2 provided for each recording surface of the disk 11 simultaneously read data from the disk 11 and write data to the disk 11.

After finishing the process for one data block, the CPU 24 determines whether or not all data blocks have been processed (step 407). If any to-be-processed data block is left, the CPU 24 changes the read-starting position of the HEAD#1 to the leading end of the next data block (step 408). Then, the CPU 24 executes the processes at the step 405 et seq. As a result, the next data block is read and transferred to the host system via the read buffer 23a. At the same time, this read data block is written to the area of the disk 11, which follows another disk area that stores a previous data block. In the case of FIGS. 3A–3C, the second data block 312(B) of the AV track 300 is read and transferred to the host system, and is, at the same time, written as the data block 332(B') to an area subsequent to the area of the data block 331(A').

After processing all data blocks, the CPU 24 determines that the original AV track 300 as a to-be-read target is no longer needed. Therefore, the CPU 24 logically erases the AV track 300 from the management information table 500, and finishes the series of processes (step 409). At this time, in the case of FIGS. 3A–3C, the AV track 330, in which the data blocks 331(A'), 332(B') and 333(C') corresponding to the data blocks 311(A), 312(B) and 313(C) of the AV track 300 are arranged continuously, is recorded in an area of the disk 11 different from the area of the AV track 300.

The embodiment constructed as above provides the following advantages:

1) Since the defragmentation process is executed in the HDD independently of the host system, i.e. the defragmentation process is completed in the HDD, the host system is not involved. This means that there is no possibility of the defragmentation process degrading the performance of the host system.

2) While an AV stream designated by the host system is being reproduced, the defragmentation process is executed using the AV stream. Accordingly, even while the defragmentation process is being executed, the AV stream can be output to the host system without interruption. This enhances the performance of the HDD.

3) For the same reason as that stated in item 2), it is not necessary to dedicate time for the defragmentation process.

4) Since data of an AV stream is temporarily stored in the read buffer 23a to be transferred to the host system, and the stored data is used for defragmentation, defragmentation can be executed without need of additional memory space.

Figure 5A:
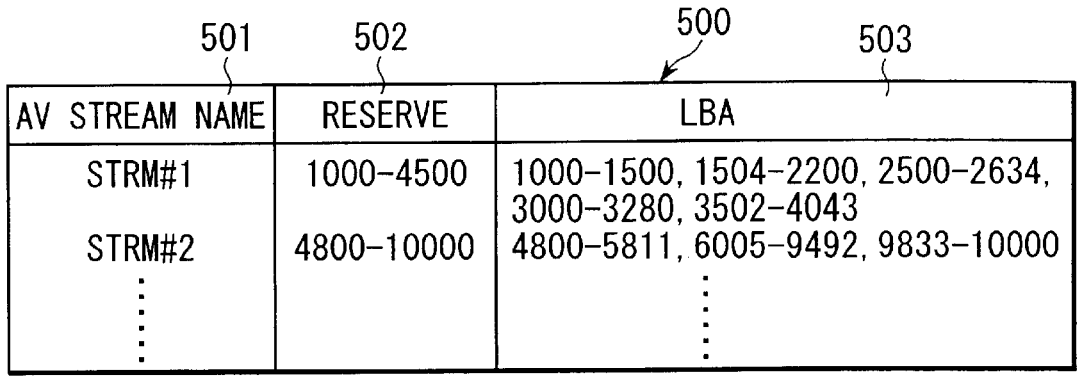
FIGS. 5A and 5B are views illustrating data configuration examples of a management information table 500 used in the first embodiment.
Figure 5B:
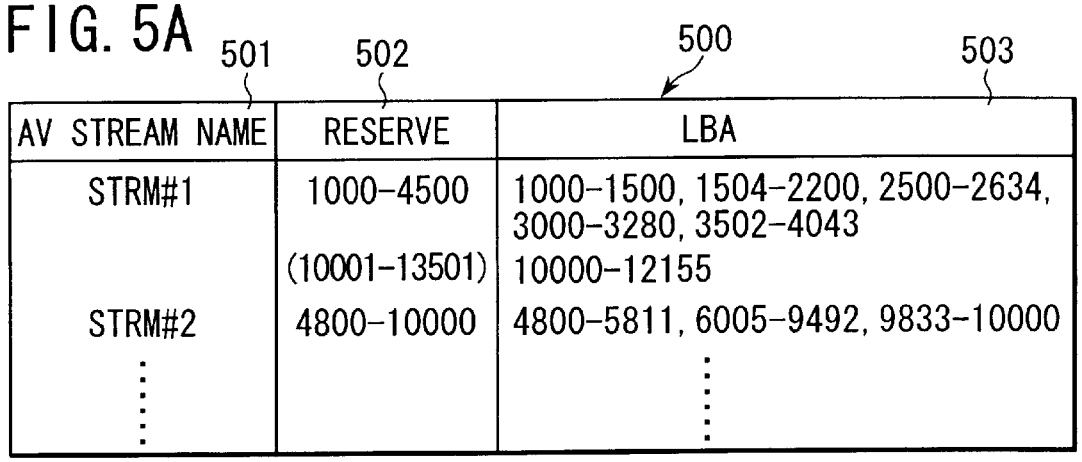

A description will now be given of the management information table 500 used to reproduce and record an AV stream. The HDD shown in FIG. 1 employs the management information table 500 of data configurations as shown in FIGS. 5A and 5B. The table 500 is stored in the FROM 25. The table 500 is used to relate each AV stream stored on the disk 11 of the HDD, to a logical block address (LBA) assigned to each data block included in each AV stream. Each entry of the table 500 includes three fields 501, 502 and 503. The field 501 is used to set an AV stream name for specifying each AV stream to be managed. The AV stream name is imparted by the host system. The field (RESERVE field) 502 is used to set the range of logical block addresses reserved for storing each AV stream in the HDD. The field (LBA field) 503 is used to set the range of logical block addresses (LBA) assigned to respective data blocks that actually form each AV stream.

As is evident, those data blocks with logical block addresses (LBA) reserved but not actually used, which are contained in each AV stream managed by the management information table 500 shown in FIGS. 5A and 5B, are data blocks that were erased by editing. In the case of, for example, an AV stream STRM#1 in FIG. 5A, data blocks erased by editing are of those of logical block addresses 1000–4500 reserved in the field 502, which are not set in the field 503, i.e. 1501–1503, 2201–2499, 2635–2999, 3281–3501 and 4044–4500.

When reproducing an AV stream designated by the host system, the CPU 24 refers to the entries in the management information table 500 that manages the stream. On the basis of the contents of the field 503, the CPU 24 determines whether or not the logical block address ranges set in the field 502 for the entry referred to include a non-continuous portion. Thus, the determination at the step 402, i.e. the determination as to whether or not a target stream contains fragmented data, is executed. In the case of entry examples for the AV stream STRM#1 in FIG. 5A, an area with addresses 1000–4500 reserved for the AV stream STRM#1 contain area portions having data erased by editing. In this case, it is determined that the stream STRM#1 contains fragmented data (step 402), whereby a contiguous empty area large enough to contain the stream STRM#1 is searched for (step 403).

The management information table 500 is referred to in the search for an empty area. If such an empty area has been detected, it is reserved and entered in the management information table 500, whereby defragmentation is executed. FIG. 5B shows a case where the area with addresses 10001–13501, which has the same size as the reserved area with addresses 1000–4500 and is independent of the reserved area, has been detected and newly reserved for defragmentation. Defragmentation is executed by continuously writing fragmented data that forms the STRM#1, to the newly reserved area, in parallel with the operation of reproducing the STRM#1.

In the defragmentation process executed during the reproduction of an AV stream, it is necessary to search for a logical block address assigned to each fragmented block data included in the AV stream (target stream). The management information table 500 is referred to in the search for the logical block address. For example, when setting the read-starting position of the HEAD#1 at the steps 404 and 408 in FIG. 4, the CPU 24 refers to the management information table 500 to acquire a leading logical block address, assigned to a leading one of target data blocks, from the field 503 of the entry that manages a corresponding target stream. The (physical address of) logical block address indicates the read-starting position. Further, a transfer size set at the step 405 is determined from the leading and trailing logical block addresses of the data block. In the case of the AV stream STRM#1 in FIG. 5A, fragmented data blocks are recorded in the area portions with addresses 1000–1500, 1504–2200, 2500–2634, 3000–3280 and 3502–4043, which are included in the area with initially reserved addresses 1000–4500. Accordingly, the addresses 1000, 1504, 2500, 3000 and 3502 are set in this order as the read-starting position of the HEAD#1. Furthermore, sizes of 501 bytes, 697 bytes, 135 bytes, 281 bytes and 542 bytes are set in this order as the transfer size of each fragmented data block.

After normally finishing the operation of continuously writing each fragmented data block to a corresponding newly reserved area (10001–13501), the area (1000–4500) reserved for original data is returned to the non-reserved state. In other words, after the defragmentation operation normally finishes, a corresponding reserved area is unreserved. This process is realized by erasing information concerning the area from the management information table 500, with the result that the area is reset as empty one.

In the embodiment, it is sufficient if the HEAD#1 (head 13a) can at least read data, and the HEAD#2 (head 13b) can at least write data. However, in light of usual read/write operations, it is preferable that the HEAD#1 and HEAD#2 each have both the read and write functions as usual heads.

Second Embodiment

In the first embodiment, in order to execute defragmentation on a fragmented AV track in parallel with the reproduction of an AV stream corresponding to the AV track, it is necessary to secure a contiguous empty area large enough to store the AV stream. A description will now be given of a second embodiment, in which defragmentation can be executed in parallel with the reproduction of an AV stream even if there is no such empty area. A hard disk drive (HDD) employed in the second embodiment has a hardware configuration similar to that of FIG. 1. Therefore, the configuration of FIG. 1 is utilized for the sake of convenience.

Figure 6A:
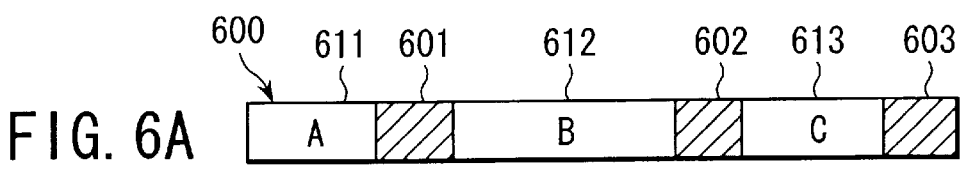
FIGS. 6A to 6C are views useful in explaining, in outline, a defragmentation process executed in a second embodiment for reproducing an AV stream from a fragmented AV track.
Figure 6B:
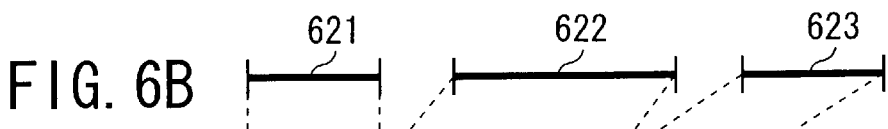
Figure 6C:
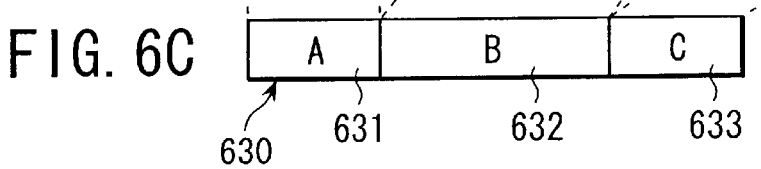

Referring first to FIGS. 6A–6C, the outline of a defragmentation process executed when reproducing an AV stream from a fragmented AV track will be described. A pre-defragmentation AV track 600 shown in FIG. 6A corresponds to an edited AV track 220 shown in FIG. 2C. In the AV track 600, data blocks 601–603 are erased as a result of the editing process, and the remaining data is fragmented into data blocks 611(A), 612(B) and 613(C).

In the second embodiment, when reproducing an AV stream from the AV track 600 in response to a request from the host system, defragmentation on the AV track 600 is executed simultaneously. To this end, the HEAD#1 (head 13a) is used for reproducing (reading), and the HEAD#2 (head 13b) is used for writing. As shown in FIG. 6B, the HEAD#1 reads the AV track 600 only during the time the HEAD#1 passes over portions 621, 622 and 623 of one of the disks 11, in which the fragmented data blocks 611(A), 612(B) and 613(C) are recorded, respectively. As a result, the data blocks 611(A), 612(B) and 613(C) are continuously read and reproduced as an AV stream.

The data blocks 612(B) and 613(C) other than the leading data block 611(A), which have been read by the HEAD#1, are sequentially written by the HEAD#2, as data blocks 632(B) and 633(C) as shown in FIG. 6C, to an area extending from the trailing end of the area in which the leading data block 611(A) is recorded. The leading data block 611(A) is treated as a data block 631(A) in the area in which the data block 611 is recorded. In other words, in the example of FIGS. 6A–6C, an AV stream is reproduced from the AV track 600. Further, an AV track 630, wherein the data blocks 611(A), 612(B) and 613(C), which form the AV stream, are continuously arranged as the data blocks 631(A), 632(B) and 633(C), is recorded in the same area as the AV track 600, with no gaps between adjacent data blocks.

Figure 7:
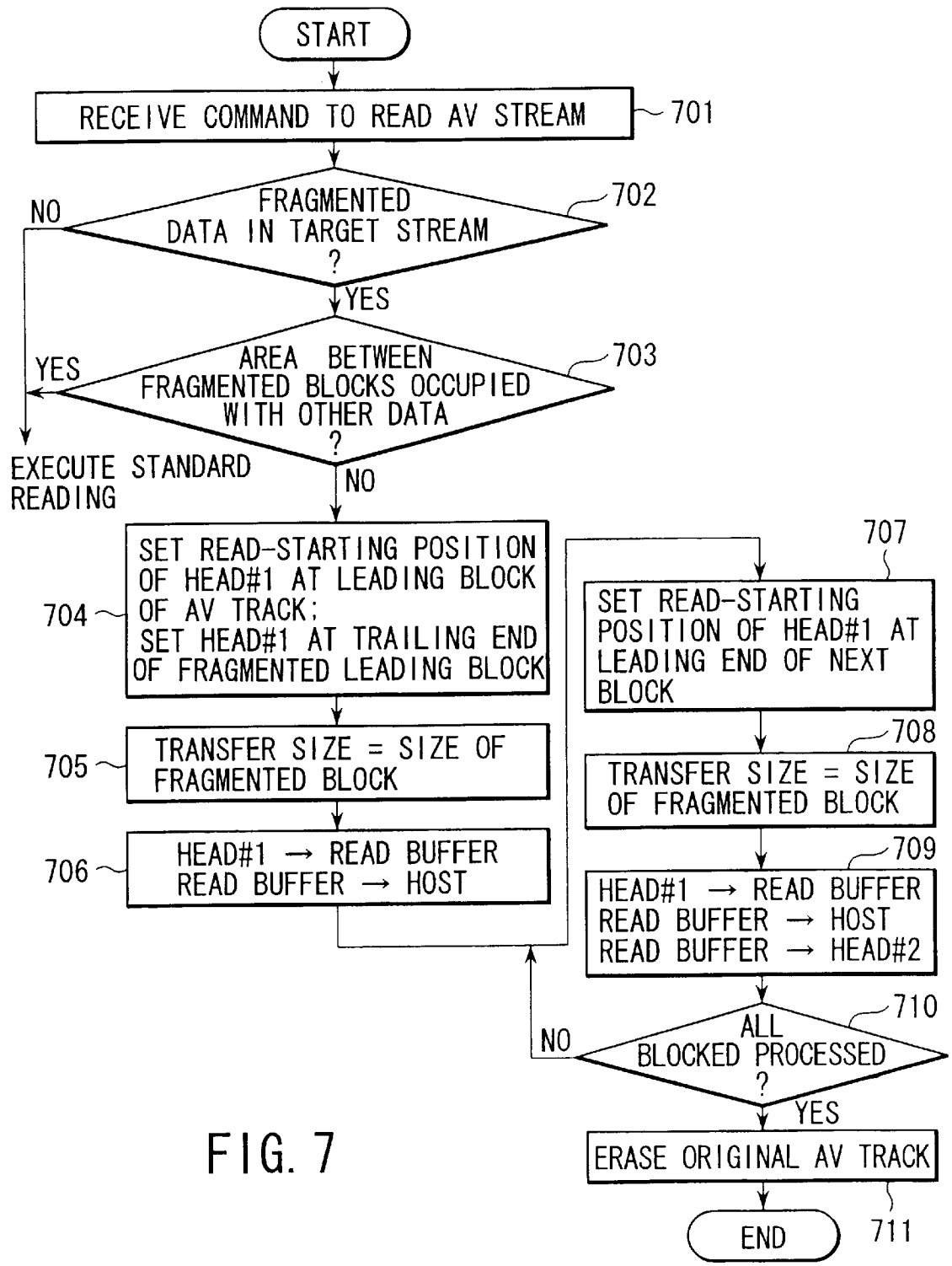
FIG. 7 is a flowchart useful in explaining a procedure for the defragmentation process employed in the second embodiment.
Figure 9:
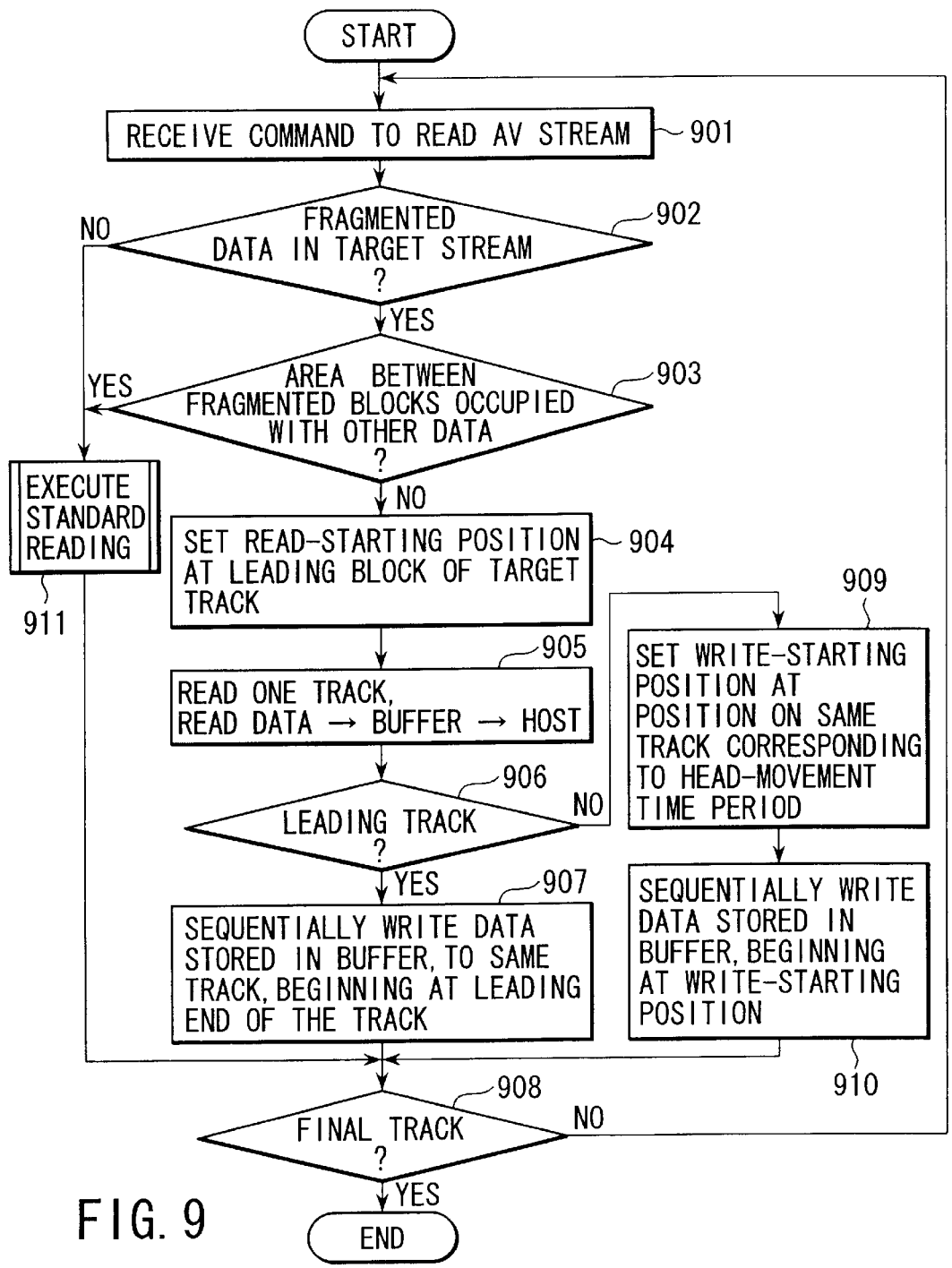
FIG. 9 is a flowchart useful in explaining a procedure for the defragmentation process employed in the third embodiment.

Referring then to the flowchart of FIG. 7, a detailed procedure for the defragmentation process in the second embodiment will be described. Suppose that the CPU 24 has received, from the host system, a command to read an AV stream (step 701). At this time, the CPU 24 first determines whether or not the AV stream (target stream) requested by the command from the host system contains fragmented data (step 702). If the target stream (AV stream) contains fragmented data, the CPU 24 determines whether or not a disk portion between fragmented data blocks is occupied by other data (step 703).

If the disk portion between the data blocks is occupied by other data, the CPU 24 executes standard read control for reading a designated AV track and reproducing an AV stream.

On the other hand, if the disk portion between the data blocks is occupied by no data, the CPU 24 determines that a defragmentation process can be executed. In this case, the CPU 24 executes a step 704. Specifically, the CPU 24 sets the read-starting position of the HEAD#1 (head 13a) at the leading end of the leading one of data blocks that is included in the designated AV track stored on the disk 11. Further, the CPU 24 sets the write-starting position of the HEAD#2 (head 13b) at the trailing end of the leading one of the data blocks included in the designated AV track. After that, the CPU 24 moves the HEAD#1 and HEAD#2 to respective set positions. As a result, in the case where the AV track 600 shown in FIG. 6A is designated, the read-starting position of the HEAD#1 is set at the leading end of the leading data block 611 of the AV track 600. Further, the write-starting position of the HEAD#2 is set at the trailing end of the leading data block 611 of the AV track 600.

After executing the step 704, the CPU 24 sets, as a transfer size, the size of the leading data block in which the read-starting position is set (step 705). Subsequently, the CPU 24 executes a step 706. Specifically, the CPU 24 causes the HEAD#1 to read a data block of the transfer size set at the step 705, from the read-starting position set at the step 704. Subsequently, the CPU 24 causes the disk controller 22 to temporarily store the data read by the HEAD#1 in the read buffer 23a of the buffer memory 23. At the step 706, the operation of transferring, to the host system, each data block stored in the read buffer 23a is executed by the disk controller 22. The data block to be transferred at first, i.e. the leading data block, is left in the same recording area even after the defragmentation process, as is clearly understood from the case of the data block 611 (631) explained with reference to FIGS. 6A–6C. Accordingly, to reproduce the leading data block, the writing operation of this block is not necessary, and hence the block is not transferred from the read buffer 23a to the HEAD#2 side.

After executing the step 706, the CPU 24 changes the read-starting position of the HEAD#1 to the leading end of the next data block (step 707). Furthermore, the CPU 24 sets, as the transfer size, the size of the next data block (step 708). Then, the CPU 24 executes a step 709. Specifically, the CPU 24 causes the HEAD#1 to read a data block of the transfer size set at the step 708, from the read-starting position changed at the step 707. Subsequently, the CPU 24 causes the disk controller 22 to temporarily store the data read by the HEAD#1 in the read buffer 23a of the buffer memory 23. At the step 709, the operation of transferring, to the host system, each data block stored in the read buffer 23a is executed by the disk controller 22. At the step 709, each data block stored in the read buffer 23a is also transferred by the disk controller 22 to the HEAD#2 via the read/write IC 20 and the head IC 19. As a result, the operation of writing each block data stored in the read buffer 23a to a disk area extending from the presently-set write-starting position is executed, using the HEAD#2, in parallel with the aforementioned operation.

Accordingly, in the case of FIGS. 6A–6C, the following read/write operation is executed. First, a usual read operation is executed, in which the leading data block 611(A) of the AV track 600 is read by the HEAD#1, then temporarily stored in the read buffer 23a, and transferred therefrom to the host system. The data block 611 is left in its original area on the disk 11 and treated as the defragmented data block 631(A). Subsequently, another usual read operation is executed, in which the second data block 612(B) of the AV track 600 is read by the HEAD#1, then temporarily stored in the read buffer 23a, and transferred therefrom to the host system. In parallel with this read operation, a write operation is executed, in which the data block 612 stored in the read buffer 23a is written as the data block 632(B) by the HEAD#2 to that area included in the same area of the AV track 600, which extends from the trailing end of the area storing the leading data block 611 (631).

Each time the CPU 24 has processed one data block after the leading data block, it determines whether or not all data blocks have been processed (step 710). If any to-be-processed data block is left, the CPU 24 re-executes the processes at the step 707 et seq. As a result, the next data block is read and transferred to the host system via the read buffer 23a. At the same time, the read data block is written to the area of the disk 11, which follows another disk area that stores a previous data block. In the case of FIGS. 6A–6C, the third data block 613(C) of the AV track 600 is read and transferred to the host system, and is, at the same time, written as the data block 633(C) to an area subsequent to the area of the data block 632.

After processing all data blocks, the CPU 24 determines that the original AV track 600 as a to-be-read target is no more necessary. Therefore, the CPU 24 logically erases the AV track 600 from the management information table 500, and finishes the series of processes (step 711). At this time, in the case of FIGS. 6A–6C, the AV track 630, in which the data blocks 631, 632 and 633 corresponding to the data blocks 611, 612 and 613 of the AV track 600 are arranged continuously, is recorded in the same area (reserved area) of the disk 11 as that of the AV track 600, with no gaps between adjacent data blocks.

As understood from the above description, the second embodiment is advantageous, in addition to the advantage obtained from the first embodiment, in that a defragmentation process can be executed while an AV stream designated by the host system is being reproduced, even if there is no contiguous empty area large enough to store the AV stream (target stream).

The first and second embodiments may be combined. In other words, if there is a contiguous empty area large enough to store a target stream, reproduced data is written to the empty area, as in the first embodiment, in parallel with the reproduction of the target stream. On the other hand, if there is no empty area, reproduced data is written to its original area (reserved area), as in the second embodiment, in parallel with the reproduction of the target stream.

Third Embodiment

The first and second embodiments require independently-operable two heads for each recording surface of each disk, to execute a defragmentation process and the reproduction of an AV stream in a parallel manner. On the other hand, in a third embodiment of the invention, a defragmentation process and the reproduction of an AV stream can be executed in a parallel manner, even if only one head is provided for each recording surface as in the prior art. The third embodiment will be described with reference to FIGS. 8A to 8D and 9. A hard disk drive (HDD) employed in the third embodiment has a hardware configuration similar to that of FIG. 1. Therefore, the configuration of FIG. 1 is utilized for the sake of convenience. However, suppose that the third embodiment employs only the head 13a (HEAD#1) for each recording surface of the disks 11.

Suppose that the physical tracks on each disk 11, which contain an AV track, are two tracks, 800(#n) as shown in FIG. 8A and 820(#n+1) as shown in FIG. 8B, and that the AV track has not yet been subjected to defragmentation. On the track 800(#n), data blocks 801–803 are cut out as a result of editing, and the remaining data is fragmented into blocks 811(A), 812(B) and 813(C). On the other hand, on the track 820(#n+1), data blocks 821–823 are cut out as a result of editing, and the remaining data is fragmented into data blocks 831(D), 832(E) and 833(F). Suppose that the portion between the data blocks 811(A) and 812(B), the portion between the data blocks 812(B) and 813(C), the portion between the data blocks 831(D) and 832(E), and the portion between the data blocks 832(E) and 833(F) are not occupied with any other data.

In this embodiment, when reproducing an AV stream from an AV track, the following process is executed, under the control of the CPU 24, in units of physical tracks that form the areas for the AV track. First, all fragmented data blocks are read by the HEAD#1 from a target physical track, are then temporarily stored in the read buffer 23a, and are transferred to the host system (steps 901–905). After the disk 11 is rotated by one rotation from the read-starting position on the physical track, data blocks in the read buffer 23a, i.e. data blocks which have been just read from the physical track, are written to the physical track, beginning at the leading end of the physical track, without any gap between the data blocks (steps 906 and 907). However, if the portion between the fragmented data blocks on the physical track store other data, the physical track is subjected only to data reading (steps 903 and 911).

Accordingly, in the case of the physical track 800(#n) shown in FIG. 8A, the data blocks 811(A), 812(B) and 813(C) are sequentially read by the HEAD#1, then temporarily stored in the read buffer 23a and transferred to the host system (steps 904 and 905). In this state, suppose that the position of the HEAD#1 coincides with the leading end of the physical track 800(#n) as a result of one rotation of the disk 11. At this time, as shown in FIG. 8C, the read data blocks in the read buffer 23a, i.e. the data blocks 811(A), 812(B) and 813(C), are sequentially written, as data blocks 841(A), 842(B) and 843(C), by the HEAD#1 to a contiguous area extending from the leading end 840 of the physical track 800(#n), with no gaps between the data blocks (steps 906 and 907). Also at this time, data stored in an area extending after the area of the data block 843(C) is logically erased, and the data-erased area is used as a non-use area 844.

Subsequently, the HEAD#1 is moved from the physical track 800(#n) to the leading end of the adjacent physical track 820(#n+1). In this state, the data blocks 831(D), 832(E) and 833(F) are sequentially read by the HEAD#1 from the physical track 820(#n+1), then temporarily stored in the read buffer 23a and transferred to the host system (step 904 and 905). Then, the read data in the read buffer 23a is sequentially written to the physical track 820(#n+1) (steps 906, 909 and 910). The write-starting position on the physical track 820(#n+1) differs from that of the leading physical track 800(#n) (step 906), and is determined in light of time necessary to move the HEAD#1 and the rotational speed of the disk 11 (step 909). Specifically, the write-starting position on the physical track 820(#n+1) is set at a position, at which the HEAD#1 can read the initial data block on the next physical track 820(#n+1) immediately after the HEAD#1 is moved, after reading data relocated in the physical track 800(#n), through a distance 850 to the next physical track 820(#n+1). To set the write-starting position, in the case of FIG. 8D, a non-use area 852 is secured, which extends from the write-starting position on the physical track 820(#n+1) to a position corresponding to a head movement time period 851. The write-starting position is set at the trailing end of the non-use area 852. Accordingly, the read data blocks in the read buffer 23a, i.e. the data blocks 831(D), 832(E) and 833(F), are sequentially written, as data blocks 861(D), 862(E) and 863(F), by the HEAD#1 to area continuously extending after the non-use area 852 of the physical track 820(#n+1).

Fourth Embodiment

Figure 11:
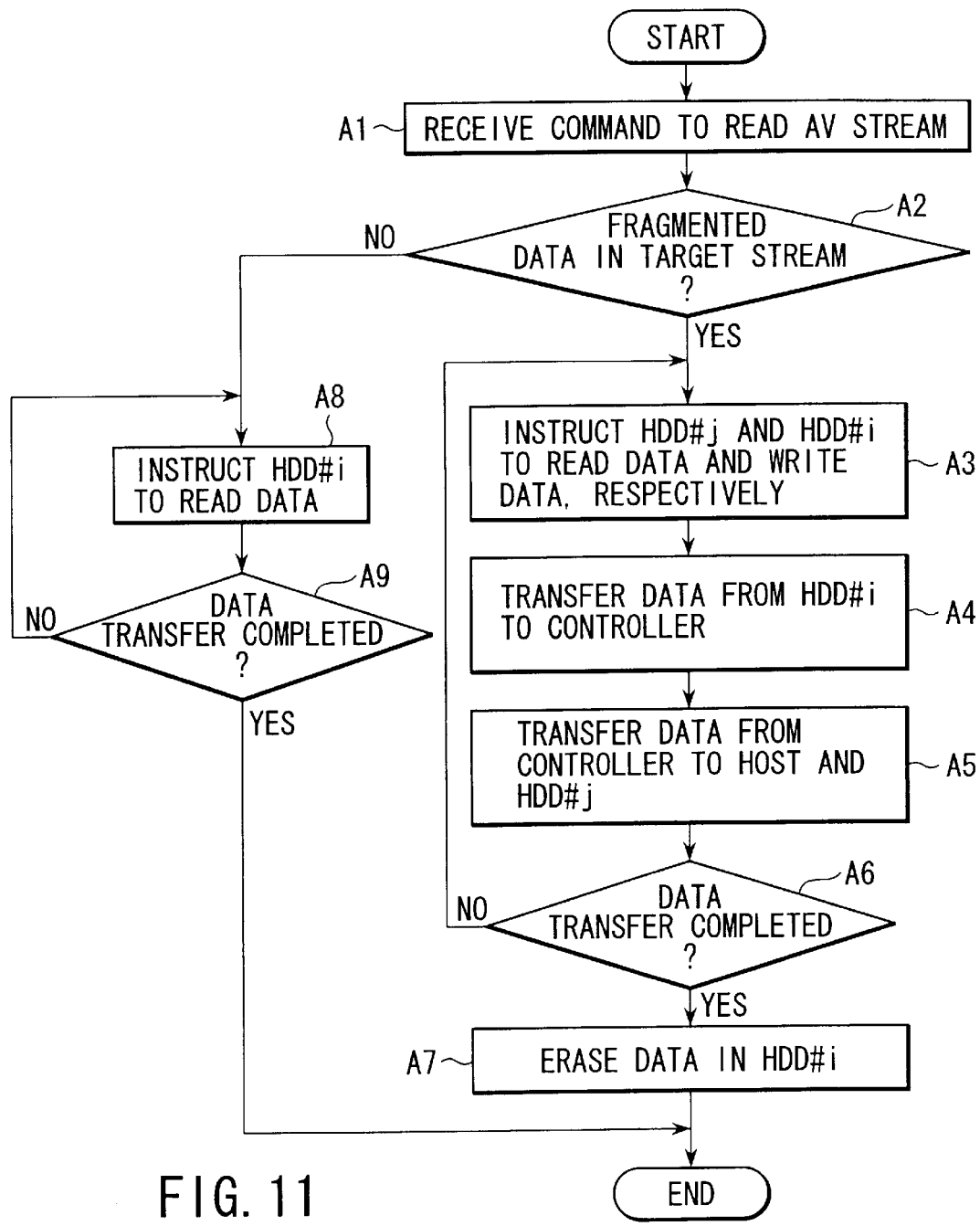
FIG. 11 is a view useful in explaining a procedure for a defragmentation process executed in the fourth embodiment for reproducing an AV stream from a fragmented AV track.

A fourth embodiment of the invention will be described with reference to FIGS. 10 and 11. FIG. 10 is a block diagram illustrating the configuration of a disk array apparatus according to the fourth embodiment. The disk array apparatus shown in FIG. 10 is a disk storage system of an RAID (Redundant Array of Inexpensive Disks) configuration, and comprises, for example, two HDDs (Hard Disk Drives), 101(#1) and 102(#2), and a disk array controller (RAID controller) 103 for controlling the HDDs 101 and 102. The controller 103 includes a buffer (buffer memory) 104. The buffer 104 is used to temporarily store data transferred from the host system and to be written to the HDD 101 or 102, and data read from the HDD 101 or 102 and to be transferred to the host system. The controller 103 is characterized in a control function for executing defragmentation on a fragmented AV track in parallel with the reproduction of a corresponding AV stream.

Referring to the flowchart of FIG. 11, a description will be given of a defragmentation process executed in the disk array apparatus of FIG. 10 when reproducing an AV stream. Suppose that the controller 103 has received, from the host system, a command to read an AV stream (step A1). At this time, the controller 103 determines whether or not the AV stream requested by the command from the host system contains fragmented data (step A2). If the requested AV stream contains fragmented data, the controller 103 executes a step A3. At the step A3, the controller 103 issues, to an HDD#i (i is 1 or 2) which stores the requested stream, a read command to read the stream therefrom in units of predetermined data lengths. At the same time, the controller 103 issues, to another HDD#j (j is 1 or 2; j≠i), a write command to write the data read from the HDD#i to the HDD#j.

In response to the read command from the controller 103, the HDD#i reads the designated data and transfers it to the controller 103 (step A4). The data transferred to the controller 103 is temporarily stored in the buffer 104 and then transferred to the host system and the HDD#j (step A5). The data transferred to the HDD#j, i.e. the data read from the HDD#i, is written to a contiguous area in the HDD#j in response to the write command. The controller 103 repeats the operations at the step A3 et seq. until the transfer of all data blocks (AV stream) designated by the host system is finished (step A6). After that, the controller 103 logically erases the requested AV stream (AV track) in the HDD#i (step A7).

As described above, in the disk array apparatus (disk storage system), which employs the standard HDD#1 and HDD#2, according to the fourth embodiment, high-speed defragmentation can be executed automatically and reliably in parallel with the reproduction of sequential data, by effectively using the buffer 104 incorporated in the controller 103. In the embodiment, if the AV stream requested by the host system contains no fragmented data, only the reading of data from the HDD#i is repeated until all designated data (AV stream) has been transferred (steps A8 and A9).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk storage system for writing data to a disk medium and reading data from the disk medium, comprising:

fragmentation determining means for determining, when a host system using the disk storage system has requested the disk storage system to read temporally-sequenced data, whether the temporally-sequenced data is fragmented into a plurality of data blocks on the disk medium; and means for controlling reading of data from the disk medium and writing of data to the disk medium, the controlling means executing second control of writing the temporally-sequenced data read from the disk medium to a contiguous area on the disk medium, in parallel with the execution of first control of reading the temporally-sequenced data from the disk medium and transferring the read temporally-sequenced data to the host system, if the fragmentation determining means determines that the temporally-sequenced data is fragmented, wherein the controlling means executes the second control after securing, as the contiguous area, a contiguous empty area large enough to store the temporally-sequenced data requested by the host system.

2. A disk storage system for writing data to a disk medium and reading data from the disk medium, comprising:

fragmentation determining means for determining, when a host system using the disk storage system has requested the disk storage system to read temporally-sequenced data, whether the temporally-sequenced data is fragmented into a plurality of data blocks on the disk medium; and means for controlling reading of data from the disk medium and writing of data to the disk medium, the controlling means executing second control of writing the temporally-sequenced data read from the disk medium to a contiguous area on the disk medium, in parallel with the execution of first control of reading the temporally-sequenced data from the disk medium and transferring the read temporally-sequenced data to the host system, if the fragmentation determining means determines that the temporally-sequenced data is fragmented, wherein the controlling means executes, as the second control, control of sequentially writing those of the fragmented data blocks forming the temporally-sequenced data, which do not include a leading data block, to an area continuously extending from a trailing end of an area which stores the leading data block, no gaps being defined between the written fragmented data blocks.

3. A disk storage system for writing data to a disk medium and reading data from the disk medium, comprising:

fragmentation determining means for determining, when a host system using the disk storage system has requested the disk storage system to read temporally-sequenced data, whether the temporally-sequenced data is fragmented into a plurality of data blocks on the disk medium;

means for controlling reading of data from the disk medium and writing of data to the disk medium, the controlling means executing second control of writing the temporally-sequenced data read from the disk medium to a contiguous area on the disk medium, in parallel with the execution of first control of reading the temporally-sequenced data from the disk medium and transferring the read temporally-sequenced data to the host system, if the fragmentation determining means determines that the temporally-sequenced data is fragmented; and a buffer memory which temporarily stores data read from the disk medium, and wherein the controlling means executes, as the first control, control of temporarily storing the temporally-sequenced data read from the disk medium and transferring, to the host system, the temporally-sequenced data temporarily stored in the buffer memory, the controlling means executing, as the second control, control of writing the temporally-sequenced data, temporarily stored in the buffer memory, to the contiguous area on the disk medium.

4. A disk storage system for writing data to a disk medium and reading data from the disk medium, comprising:

fragmentation determining means for determining, when a host system using the disk storage system has requested the disk storage system to read temporally-sequenced data, whether the temporally-sequenced data is fragmented into a plurality of data blocks on the disk medium;

means for controlling reading of data from the disk medium and writing of data to the disk medium, the controlling means executing second control of writing the temporally-sequenced data read from the disk medium to a contiguous area on the disk medium, in parallel with the execution of first control of reading the temporally-sequenced data from the disk medium and transferring the read temporally-sequenced data to the host system, if the fragmentation determining means determines that the temporally-sequenced data is fragmented;

a first head at least used to read data from the disk medium; and a second head at least used to write data to the disk medium and operable independently of the first head, and wherein the controlling means executes, as the first control, control of causing the first head to read the temporally-sequenced data from the disk medium, and transferring the read temporally-sequenced data to the host system, the controlling means executing, as the second control, control of causing the second head to write the temporally-sequenced data, read from the disk medium by the first head, to the contiguous area on the disk medium.

5. The disk storage system according to claim 4, further comprising empty-area determining means for determining whether the disk medium contains a contiguous empty area large enough to store the temporally-sequenced data requested by the host system, and wherein the controlling means executes the second control using the contiguous empty area as the contiguous area, if the fragmentation determining means determines that the temporally-sequenced data is fragmented, and if the empty-area determining means determines that the disk medium contains a contiguous empty area large enough to store the temporally-sequenced data requested by the host system.

6. The disk storage system according to claim 4, further comprising inter-block-area determining means for determining whether a portion between the data blocks forming the temporally-sequenced data stores other data, and wherein the controlling means executes, as the second control, control of causing the second head to sequentially write those of a plurality of fragmented data blocks forming the temporally-sequenced data, which do not include a leading data block, to an area continuously extending from a trailing end of an area which stores the leading data block, with no gaps between the written fragmented data blocks, if the fragmentation determining means determines that the temporally-sequenced data is fragmented, and if the inter-block-area determining means determines that a portion between the data blocks forming the temporally-sequenced data stores no other data.

7. The disk storage system according to claim 4, further comprising:

empty-area determining means for determining whether the disk medium contains a contiguous empty area large enough to store the temporally-sequenced data requested by the host system; and inter-block-area determining means for determining whether a portion between the data blocks forming the temporally-sequenced data stores other data, and wherein the controlling means executes the second control using the contiguous empty area as the contiguous area, if the fragmentation determining means determines that the temporally-sequenced data is fragmented, and if the empty-area determining means determines that the disk medium contains a contiguous empty area large enough to store the temporally-sequenced data requested by the host system, the controlling means executing, as the second control, control of causing the second head to sequentially write those of a plurality of fragmented data blocks forming the temporally-sequenced data, which do not include a leading data block, to an area continuously extending from a trailing end of an area which stores the leading data block, with no gaps between the written fragmented data blocks, if the fragmentation determining means determines that the temporally-sequenced data is fragmented, if the empty-area determining means determines that the disk medium contains a contiguous empty area large enough to store the temporally-sequenced data requested by the host system, and if the inter-block-area determining means determines that a portion between the data blocks forming the temporally-sequenced data stores no other data.

8. A disk storage system for writing data to a disk medium and reading data from the disk medium, comprising:

fragmentation determining means for determining, when a host system using the disk storage system has requested the disk storage system to read temporally-sequenced data, whether the temporally-sequenced data is fragmented into a plurality of data blocks on the disk medium;

means for controlling reading of data from the disk medium and writing of data to the disk medium, the controlling means executing second control of writing the temporally-sequenced data read from the disk medium to a contiguous area on the disk medium, in parallel with the execution of first control of reading the temporally-sequenced data from the disk medium and transferring the read temporally-sequenced data to the host system, if the fragmentation determining means determines that the temporally-sequenced data is fragmented;

a first head at least used to read data from the disk medium;

a second head at least used to write data to the disk medium and operable independently of the first head; and a buffer memory which temporarily stores data read from the disk medium, and wherein the controlling means executes, as the first control, control of causing the first head to read the temporally-sequenced data from the disk medium, then temporarily storing the read data in the buffer memory, and transferring, to the host system, the temporally-sequenced data temporarily stored in the buffer memory, the controlling means executing, as the second control, control of causing the second head to write the temporally-sequenced data, temporarily stored in the buffer memory, to the contiguous area on the disk medium.

9. A disk storage system comprising:

a disk medium including a plurality of concentric physical tracks on which data is recorded;

a head used to write data to each of the physical tracks and to read data from each of the physical tracks;

a buffer memory which temporarily stores data read from the disk medium;

fragmentation determining means for determining, when a host system using the disk storage system has requested the disk storage system to read temporally-sequenced data and if temporally-sequenced data is recorded on at least one of the physical tracks, whether the temporally-sequenced data recorded on the at least one of the physical tracks is fragmented into a plurality of data blocks;

inter-block-area determining means for determining whether a portion between the data blocks stores other data, if the fragmentation determining means determines that the temporally-sequenced data recorded on the at least one physical track is fragmented into the data blocks;

means for controlling reading of data from the disk medium and writing of data to the disk medium, the controlling means executing first control of causing the head to read the data blocks from the at least one physical track, and transferring the read data blocks to the host system, in parallel with second control of causing the head to sequentially write the data blocks, read from the at least one physical track, to a contiguous area on the at least one physical track, in which the data blocks were originally recorded, no gaps being defined between the written data blocks; and a buffer memory which temporarily stores data read from the disk medium, and wherein the controlling means executes, as the first control, control of causing the head to read, from the at least one physical track, the data blocks as targets of determination by the inter-block-area determining means, temporarily storing the data blocks in the buffer memory, and transferring the data blocks, temporarily stored in the buffer memory, to the host system, the controlling means executing, as the second control, control of causing the head to write the data blocks, temporarily stored in the buffer memory, to a contiguous area on the at least one physical track, with no gaps between the written data blocks.

10. A disk storage system comprising:

a disk medium including a plurality of concentric physical tracks on which data is recorded;

a head used to write data to each of the physical tracks and to read data from each of the physical tracks;

fragmentation determining means for determining, when a host system using the disk storage system has requested the disk storage system to read temporally-sequenced data and if temporally-sequenced data is recorded on at least one of the physical tracks, whether the temporally-sequenced data recorded on the at least one of the physical tracks is fragmented into a plurality of data blocks;

inter-block-area determining means for determining whether a portion between the data blocks stores other data, if the fragmentation determining means determines that the temporally-sequenced data recorded on the at least one physical track is fragmented into the data blocks; and means for controlling reading of data from the disk medium and writing of data to the disk medium, the controlling means executing first control of causing the head to read the data blocks from the at least one physical track, and transferring the read data blocks to the host system, in parallel with second control of causing the head to sequentially write the data blocks, read from the at least one physical track, to a contiguous area on the at least one physical track, in which the data blocks were originally recorded, no gaps being defined between the written data blocks; and wherein:

the fragmentation determining means determines, if the temporally-sequenced data is recorded on at least two of the physical tracks, whether that part of the temporally-sequenced data, which is recorded on each of the at least two physical tracks, is fragmented into a plurality of data blocks;

the inter-block-area determining means determines whether a portion between the data blocks stores other data, each time the fragmentation determining means determines that the part of the temporally-sequenced data, which is recorded on each of the at least two physical tracks, is fragmented into the data blocks; and the controlling means executes the second control, in which the controlling means sequentially locates, if the inter-block-area determining means determines that a portion between data blocks on a leading one of the at least two physical tracks stores no data, the data blocks on a contiguous area of the leading physical track, extending from a portion of the leading physical track, at which a leading data block on the leading physical track was located, and the controlling means secures a non-use area if the inter-block-area determining means determines that a portion between data blocks on a remaining one of the at least two physical tracks stores no data, and sequentially locates the data blocks to a contiguous area of the remaining physical track, which extends from the non-use area, the non-use area being an area extending from a leading end of the remaining physical track to a position corresponding to a head movement time period elapsing from a time when the head has read a last data block on the leading physical track.

11. A disk storage system comprising:

a plurality of disk drives which record and reproduce data; and a disk array controller which controls the disk drives, the controller including fragmentation determining means for determining, upon receiving a command to read temporally-sequenced data, issued from a host system using the disk storage system, whether the temporally-sequenced data is fragmented into a plurality of data blocks in a corresponding one of the disk drives, the controller also including controlling means for controlling data transfer between the disk drives and the host system, the controlling means executing, in a parallel manner, first control of reading the temporally-sequenced data from the corresponding disk drive and transferring the read data to the host system, and second control of writing the temporally-sequenced data, read from the corresponding disk drive, to a contiguous area on another disk drive different from the corresponding disk drive, if the fragmentation determining means determines that the temporally-sequenced data is fragmented.

12. The disk storage system according to claim 11, wherein:
the disk array controller includes a buffer memory which temporarily stores data transferred from the host system and to be written to one of the disk drives, and data read from one of the disk drives and to be transferred to the host system; and
the controlling means executes, as the first control, control of temporarily storing, in the buffer memory, the temporally-sequenced data read from the corresponding disk drive, and transferring, to the host system, the temporally-sequenced data temporarily stored in the buffer memory, the controlling means executing, as the second control, control of writing the temporally-sequenced data, temporarily stored in the buffer memory, to a contiguous area of said another disk drive.

13. A disk storage system for writing data to a disk medium and reading data from the disk medium, comprising:
a buffer memory which temporarily stores data read from the disk medium, and data to be written to the disk medium;
a disk controller which receives a command transferred from a host system that uses the disk storage system, and controls data transfer between the disk medium and the buffer memory and between the host system and the buffer memory;
a nonvolatile memory which stores a control program; and
a CPU which executes the control program, the CPU causing the disk controller to execute, in a parallel manner, first control of reading temporally-sequenced data from the disk medium, temporarily storing the read data in the buffer memory, and transferring the data, temporarily stored in the buffer memory, to the host system, and second control of transferring the data, temporarily stored in the buffer memory, to the disk medium, and writing it to a contiguous area on the disk medium, when the reading of the temporally-sequenced data has been requested by the command, if the temporally-sequenced data is fragmented into a plurality of data blocks on the disk medium.

14. A method for defragmentation for use in a disk storage system in which a first head at least reads data from a disk medium, and a second head, operable independently of the first head, at least writes data to the disk medium, comprising:
determining, when the disk storage system has been requested to read temporally-sequenced data by a host system which uses the disk storage system, whether the temporally-sequenced data is fragmented into a plurality of data blocks on the disk medium;
causing the first head to read the temporally-sequenced data from the disk medium and transferring the read data to the host system, if said determining determines that the temporally-sequenced data is fragmented into the data blocks; and
causing the second head to write the read, temporally-sequenced data to a contiguous area on the disk medium, in parallel with said reading the temporally-sequenced data and transferring the read data.

15. The method according to claim 14, wherein:
said reading the temporally-sequenced data and transferring the read data includes temporarily storing the read data in a buffer memory and transferring the data, temporarily stored in the buffer memory, to the host system; and
said writing includes writing the data, temporarily stored in the buffer memory, to the contiguous area on the disk medium.

16. A method for defragmentation for use in a disk storage system in which a head writes and reads data to and from a disk medium including a plurality of concentric physical tracks on which data is recorded, comprising:
determining, when a host system that uses the disk storage system has requested reading of temporally-sequenced data and if the temporally-sequenced data is recorded on at least one of the physical tracks, whether the temporally-sequenced data recorded on the at least one of the physical tracks is fragmented into a plurality of data blocks;
determining whether a portion between the fragmented data blocks stores other data, if it is determined that the temporally-sequenced data recorded on the at least one physical track is fragmented into the data blocks;
causing the head to read the data blocks from the at least one physical track and transferring the read data blocks to the host system, if it is determined that the portion between the fragmented data blocks stores no data; and
causing the head to sequentially write the read data blocks to a contiguous area on the at least one physical track, with no gaps between the written data, in parallel with said causing the head to read the data blocks from the at least one physical track and transferring the read data; and wherein:
said reading the data blocks from the at least one physical block and transferring the read data includes temporarily storing the read data in a buffer memory and transferring the data, temporarily stored in the buffer memory, to the host system; and
said writing includes writing the data, temporarily stored in the buffer memory, to a contiguous area on the at least one physical track.

17. A method for defragmentation for use in a disk storage system in which a head writes and reads data to and from a disk medium including a plurality of concentric physical tracks on which data is recorded, comprising:
determining, when a host system that uses the disk storage system has requested reading of temporally-sequenced data and if the temporally-sequenced data is recorded on at least one of the physical tracks, whether the temporally-sequenced data recorded on the at least one of the physical tracks is fragmented into a plurality of data blocks;
determining whether a portion between the fragmented data blocks stores other data, if it is determined that the temporally-sequenced data recorded on the at least one physical track is fragmented into the data blocks;
causing the head to read the data blocks from the at least one physical track and transferring the read data blocks to the host system, if it is determined that the portion between the fragmented data blocks stores no data; and causing the head to sequentially write the read data blocks to a contiguous area on the at least one physical track, with no gaps between the written data, in parallel with said causing the head to read the data blocks from the at least one physical track and transferring the read data; and wherein:

said determining whether the temporally-sequenced data is fragmented into a plurality of data blocks includes determining, if the temporally-sequenced data is recorded on at least two of the physical tracks, whether that part of the temporally-sequenced data, which is recorded on each of the at least two physical tracks, is fragmented into a plurality of data blocks;

said determining whether the portion between the data blocks stores other data includes determining whether the portion between the data blocks stores other data each time it is determined that the part of the temporally-sequenced data, which is recorded on each of the at least two physical tracks, is fragmented into the data blocks; and said writing includes locating, if a portion between data blocks on a leading one of the at least two physical tracks stores no data, the data blocks on a contiguous area of the leading physical track, extending from a portion of the leading physical track, at which a leading data block on the leading physical track was located, and securing a non-use area if a portion between data blocks on a remaining one of the at least two physical tracks stores no data, and sequentially writing the data blocks to a contiguous area of the remaining physical track, which extends from the non-use area, the non-use area being an area extending from a leading end of the remaining physical track to a position corresponding to a head movement time period elapsing from a time when a last data block on the leading physical track has been read.

* * * * *